(12) United States Patent
Kim (10) Patent No.: US 11,162,447 B2
(45) Date of Patent: Nov. 2, 2021

(54) VEHICLE PREDICTIVE CONTROL SYSTEM BASED ON BIG DATA AND METHOD THEREOF

(71) Applicants: HYUNDAI MOTOR COMPANY, Seoul (KR); KIA MOTORS CORPORATION, Seoul (KR)

(72) Inventor: Seung Bum Kim, Seongnam-Si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 371 days.

(21) Appl. No.: 16/034,861

(22) Filed: Jul. 13, 2018

(65) Prior Publication Data

US 2019/0234336 A1     Aug. 1, 2019

(30) Foreign Application Priority Data

Jan. 30, 2018 (KR) .................. 10-2018-0011077

(51) Int. Cl.
    *F02D 41/22*     (2006.01)
    *F02D 41/00*     (2006.01)
    (Continued)

(52) U.S. Cl.
    CPC ........... *F02D 41/22* (2013.01); *F02D 31/001* (2013.01); *F02D 41/0002* (2013.01);
    (Continued)

(58) Field of Classification Search
    CPC .............. F02D 41/22; F02D 2200/602; F02D 2200/503; F02D 2200/1015;
    (Continued)

(56) References Cited

U.S. PATENT DOCUMENTS 8,041,779 B2    10/2011   Habaguchi et al.
8,495,179 B2    7/2013   Habaguchi et al.
(Continued)

FOREIGN PATENT DOCUMENTS

JP     H09-093658 A    4/1997
JP     2004-272375 A    9/2004
(Continued)

*Primary Examiner* — Mathew Franklin Gordon
(74) *Attorney, Agent, or Firm* — Morgan, Lewis & Bockius LLP (57) ABSTRACT

A vehicle predictive control system based on big data includes: a vehicle terminal, which is installed in each of a plurality of vehicles, collecting status information related with an in-vehicle device in a corresponding vehicle to transmit the collected status information in real time, and transmitting problem occurrence information upon problem occurrence of the in-vehicle device; and a big data service provider classifying and storing the status information received from the vehicle terminal as big data, and obtaining a problem occurrence condition based on the status information to transmit information corresponding to the problem occurrence condition to the vehicle terminal when receiving the problem occurrence information of the in-vehicle device from the vehicle terminal of at least some vehicles among the plurality of vehicles.

18 Claims, 4 Drawing Sheets

(51) Int. Cl.
*F02N 11/08* (2006.01)
*F02P 5/145* (2006.01)
*G06N 99/00* (2019.01)
*G07C 5/00* (2006.01)
*G06N 20/00* (2019.01)
*G06F 16/28* (2019.01)
*F02D 31/00* (2006.01)
*F02D 41/26* (2006.01)
*F02D 41/12* (2006.01)
*F02D 41/02* (2006.01)

(52) U.S. Cl.
CPC ........ *F02D 41/266* (2013.01); *F02N 11/0818* (2013.01); *F02P 5/145* (2013.01); *G06F 16/283* (2019.01); *G06N 20/00* (2019.01); *G07C 5/008* (2013.01); *F02D 41/021* (2013.01); *F02D 41/123* (2013.01); *F02D 2041/227* (2013.01); *F02D 2200/04* (2013.01); *F02D 2200/0406* (2013.01); *F02D 2200/0614* (2013.01); *F02D 2200/1002* (2013.01); *F02D 2200/1015* (2013.01); *F02D 2200/503* (2013.01); *F02D 2200/602* (2013.01)

(58) Field of Classification Search
CPC ..... F02D 2200/1002; F02D 2200/0614; F02D 2200/0406; F02D 2200/04; F02D 2041/227; F02D 41/123; F02D 41/021; F02D 41/266; F02D 41/0002; F02D 31/001; G07C 5/008; F02P 5/145; F02N 11/0818; G06F 16/283; G06N 20/00
See application file for complete search history.

(56) References Cited

U.S. PATENT DOCUMENTS

| | | | |
|---|---|---|---|
| 10,337,438 B2* | 7/2019 | Jiang | F02N 11/0803 |
| 2016/0003621 A1* | 1/2016 | Koenig | G06F 3/04845 |
| | | | 701/31.4 |
| 2016/0164127 A1* | 6/2016 | Kwon | H01M 8/04753 |
| | | | 429/429 |
| 2017/0039785 A1* | 2/2017 | Richter | G07C 5/0808 |
| 2018/0144388 A1* | 5/2018 | Mattern | G01C 21/3679 |

FOREIGN PATENT DOCUMENTS

| | | |
|---|---|---|
| JP | 2014-234113 A | 12/2014 |
| JP | 2015-102883 A | 6/2015 |

* cited by examiner

VEHICLE PREDICTIVE CONTROL SYSTEM BASED ON BIG DATA AND METHOD THEREOF

CROSS-REFERENCE TO RELATED APPLICATION

This application claims under 35 U.S.C. § 119(a) the benefit of priority to Korean Patent Application No. 10-2018-0011077 filed on Jan. 30, 2018, the entire contents of which are incorporated herein by reference.

TECHNICAL FIELD

The present disclosure relates to a vehicle predictive control system based on big data and a method thereof, and more particularly, to a vehicle predictive control system based on big data and a method thereof, which determines problem occurrence situations such as engine stall or failure, fuel efficiency reduction, and power performance degradation based on Artificial Intelligence and big data technology using the information collected from the vehicles during driving, and provides information to a controller of another vehicle to be used for a control of feedforward for an in-vehicle device such as an engine.

BACKGROUND

Recently, vehicle-related big data has been applied to provide vehicle users with information such as a consumables replacement cycle or real-time repair status, and a maintenance history.

However, only some information for managing and maintaining the vehicle based on the vehicle-related big data is available. There is no service for predicting problems that may occur in a vehicle in advance and preventing the problems from occurring.

Particularly, there is no technology that can predict problem occurrence in the vehicle such as engine stall or failure, fuel efficiency reduction, and power performance degradation using the information collected from the vehicles based on Artificial Intelligence (AI) and big data technology, and can further predicatively control the vehicle so as to prevent the problems in the vehicle and the accident from occurring, using the predicted information.

For example, when an engine is turned off during driving, operating a handle (a steering wheel) or a brake pedal become difficult, thus increasing the risk of accidents and the serious risk to the safety of a driver and passengers.

Accordingly, a predictive control technology is needed that can predict the problem occurrence such as engine stall in advance using the information collected from the vehicles, and prevent the accident by controlling the vehicle so that the problem is not caused in the vehicle using the predicted information.

The above information disclosed in this Background section is only for enhancement of understanding of the background of the disclosure, and therefore, it may contain information that does not form the prior art that is already known in this country to a person of ordinary skill in the art.

SUMMARY OF THE DISCLOSURE

The present disclosure is intended to solve the problem, and an object of the present disclosure is to provide a predictive control system and a method thereof, which learns problem occurrence situations such as engine stall or failure, fuel efficiency reduction, and power performance degradation based on Artificial Intelligence and big data from the information collected in the vehicles, and provides the learned information to a controller of another vehicle to be used for a control of feedforward for an in-vehicle device such as an engine, thus preventing the occurrence of the problem in the vehicle and the accident caused by it in advance.

According to one aspect of the present disclosure, a vehicle predictive control system based on big data includes: a vehicle terminal installed in each of a plurality of vehicles for collecting status information related with an in-vehicle device in a corresponding vehicle to transmit the collected status information in real time, and transmitting problem occurrence information upon problem occurrence of the in-vehicle device, and a big data service provider for classifying and storing the status information received from the vehicle terminal, and obtaining a problem occurrence condition based on the received status information at the problem occurrence timing of the in-vehicle device to transmit the information corresponding to the problem occurrence condition to the vehicle terminal when receiving the problem occurrence information of the in-vehicle device from the vehicle terminal of at least some vehicles among the plurality of vehicles, wherein the vehicle terminal determines whether the current status information collected in the vehicle corresponds to the problem occurrence condition based on the information corresponding to a received problem occurrence condition when receiving the information corresponding to the problem occurrence condition from the big data service provider, and performs a predetermined control for the in-vehicle device if the status information corresponds to the problem occurrence condition.

According to another aspect of the present disclosure, a vehicle predictive control method based on big data that includes a vehicle terminal of each vehicle of a plurality of vehicles transmitting the collected status information in real time by collecting status information related with an in-vehicle device, and transmitting problem occurrence information upon problem occurrence of the in-vehicle device; a big data service provider classifying and storing by collecting the status information transmitted by the vehicle terminal of each vehicle as big data; the big data service provider obtaining a problem occurrence condition based on a received status information at the problem occurrence timing of the in-vehicle device when receiving the problem occurrence information of the in-vehicle device from the vehicle terminal of at least some vehicles of the plurality of vehicles; transmitting the information corresponding to the obtained problem occurrence condition to the vehicle terminal of each vehicle; the vehicle terminal determining whether the current status information collected in the vehicle corresponds to the problem occurrence condition based on the information corresponding to the problem occurrence condition received from the big data service provider; and the vehicle terminal performing a predetermined control for the in-vehicle device if it is determined to correspond to the problem occurrence condition.

According to the vehicle predictive control system based on big data and the method thereof in accordance with the present disclosure, it is possible for the service provider outside the vehicle to collect various status information related with the in-vehicle device such as the engine and the problem occurrence information of the in-vehicle device such as engine stall or failure, fuel efficiency reduction, and power performance degradation from the vehicles during driving on an actual road as big data to perform the learning that analyzes and classifies cases, situations, and operational condition of the problem occurrence for each vehicle based on Artificial Intelligence, and to provide the learned information to the controller of the vehicle that can be communicated to be used for the feedforward control for the relevant device, thus effectively preventing the problem occurrence such as engine stall or failure, fuel efficiency reduction, and power performance degradation in each vehicle.

Other aspects and exemplary embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, exemplary embodiments will be described so that those skilled in the art can easily practice the present disclosure. However, the present disclosure is not limited to those exemplary embodiments and can be embodied in other forms.

In the whole description, it will be understood that when a component is referred to as being "comprising" any component, it does not exclude other components, but can further comprises the other components unless otherwise specified.

The present disclosure relates to a vehicle predictive control method that can analyze and learn problem occurrence situations of an in-vehicle device using the information received from vehicles based on Artificial Intelligence and big data technology and then provide another vehicle with the learned information, and use the received learned information for a predictive control for the in-vehicle device so that the same problem is not caused in another vehicle.

More specifically, in the present disclosure, a big data service provider clusters and stores by collecting, classifying, and analyzing various status information related with the in-vehicle device such as the engine and the problem occurrence information of the in-vehicle device in real time such as engine stall or failure, fuel efficiency reduction, and power performance degradation as big data in real time from the vehicles during driving on the road.

Particularly, the big data service provider (hereinafter, referred to as 'service provider') performs the learning that continuously obtains and updates the information corresponding to problem occurrence cases and its problem occurrence conditions for each vehicle based on Artificial Intelligence using the information collected in real time, and then provides the learned information to a controller of the same-typed vehicle that can be communicated to be used for a feedforward control for the in-vehicle device such as an engine, thus preventing the occurrence of the problem in the vehicle and the accident caused by it.

Hereinafter, a configuration of a predictive control system in accordance with an embodiment of the present disclosure will be described with reference to the drawings.

Figure 1:
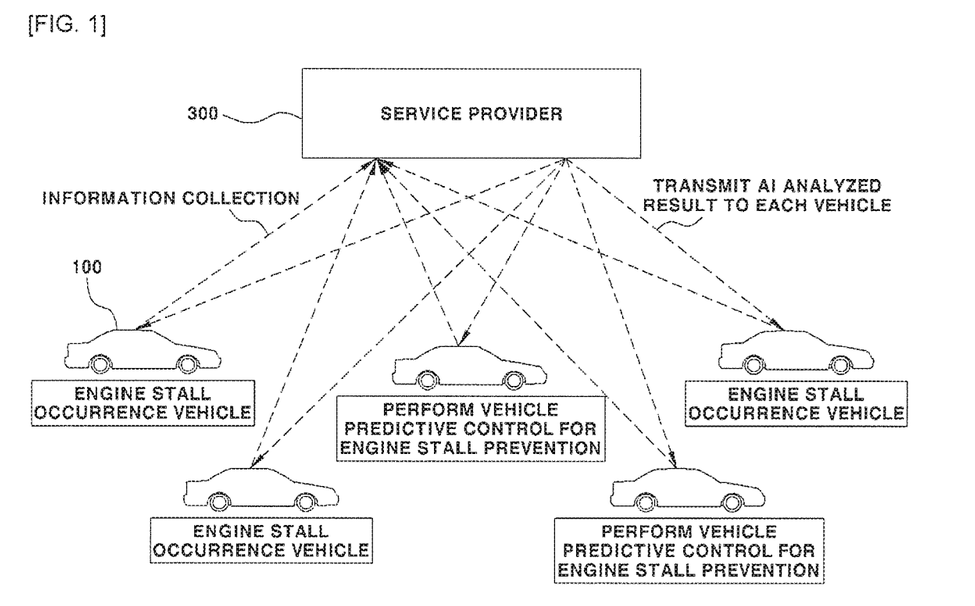
FIG. 1 is a diagram illustrating a configuration of a vehicle predictive control system in accordance with an embodiment of the present disclosure.
Figure 2:
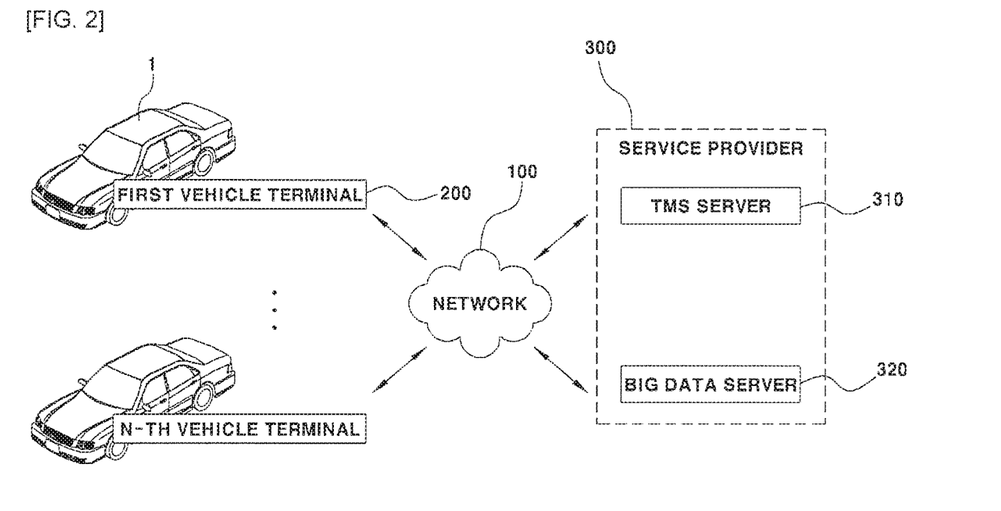
FIG. 2 is a conceptual diagram illustrating a status in which a vehicle predictive control is performed in accordance with an embodiment of the present disclosure.

FIG. 1 is a diagram illustrating a configuration of a vehicle predictive control system in accordance with an embodiment of the present disclosure, and FIG. 2 is a conceptual diagram illustrating the status in which a vehicle predictive control is performed in accordance with an embodiment of the present disclosure.

As illustrated in FIG. 1, a vehicle predictive control system in accordance with an embodiment of the present disclosure includes a terminal installed in a vehicle 1 (hereinafter, referred to as 'a vehicle terminal 200') and a service provider 300 outside the vehicle 1, and the vehicle terminal 200 and the service provider 300 are connected to each other through a network 100 to exchange information.

For example, the vehicle 1 in which engine stall during driving occurs transmits engine stall occurrence information and vehicle status information when the engine stall occurred to the service provider 300, and the service provider 300 learns by collecting and analyzing the information received in the vehicle 1 and then provides other vehicles with the learned information as the information for predictive control for preventing the engine stall.

Accordingly, each vehicle 1 during driving on the road performs the control for the engine stall not to be caused based on the information received from the service provider 300.

In the present disclosure, the network 100 refers to the network that can transmit and receive data via a predetermined protocol using various wired/wireless communication technology such as internet network, intranet network, mobile communication network, and satellite communication network.

The network 100 is the concept that collectively refers to not only a closed network such as Local Area Network (LAN) and Wide Area Network (WAN) and an opened network such as intranet, but also networks such as Code Division Multiple Access (CDMA), Wideband Code Division Multiple Access (WCDMA), Global System for Mobile Communication (GSM), Long Term Evolution (LTE), Wireless-Fidelity (Wi-Fi), and Evolved Packet Core (EPC), next-generation network to be implemented in the future and computing network.

The vehicle predictive control system in accordance with an embodiment of the present disclosure includes a plurality of vehicle terminals 200, and the plurality of vehicle terminals 200 mean the terminals installed in the plurality of vehicles 1 using the vehicle predictive control service.

In addition, the service provider 300 can include a Telematics Multimedia System (TMS) server 310 and a big data server 320.

Figure 3:
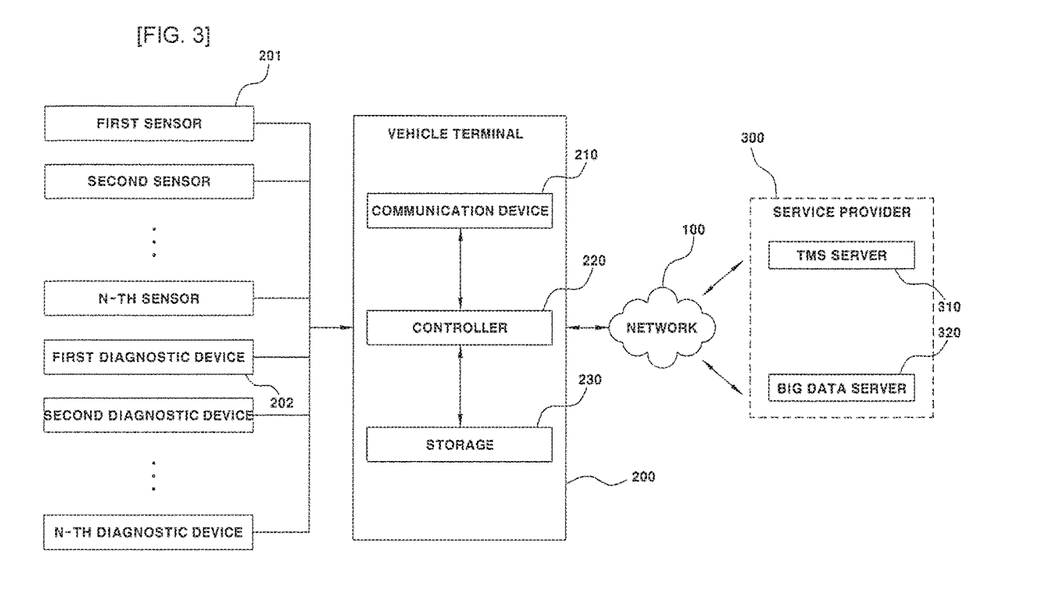
FIG. 3 is a diagram illustrating a configuration of a vehicle terminal in a vehicle predictive control system in accordance with an embodiment of the present disclosure.

FIG. 3 is a diagram illustrating a configuration of the vehicle terminal in the vehicle predictive control system in accordance with an embodiment of the present disclosure.

Referring to FIG. 3, in the present disclosure, each vehicle terminal 200 is mounted in each vehicle, and the service provider 300 outside the vehicle includes a first communication device 210 for performing the wireless communication with the TMS server 310 providing Telematics service or the big data server 320 providing big data service, for example, via the network 100.

In addition, each vehicle terminal 200 includes a controller 220 that manipulates and processes the received information, and generates or outputs the information including a signal or data that will be transmitted to the vehicle.

For example, the vehicle terminal 200 can become a TMS terminal in a general vehicle, or the controller 220 in the vehicle terminal can be a controller performing a control for the in-vehicle device, for example, if the in-vehicle device to be the main predictive control object is an engine, the controller 220 can be a general engine controller (an Engine Control Unit (ECU); an Engine Management System (EMS)).

The controller 220 of the vehicle terminal 200 receives driving information, status information, and diagnostic information of the in-vehicle device such as the engine from a sensor 201 and a diagnostic device 202 provided in the vehicle 1.

Herein, the information received and collected in the controller 220 of the vehicle terminal 200 can include main information or a signal related with the engine operation and control, the engine status if the in-vehicle device is the engine, and the engine-related information and signal are transmitted to the external service provider 300 as a Vehicle Customer Relation Management (VCRM) signal.

For this purpose, the sensor 201 can include various sensors or detection elements related with operation and control of the in-vehicle device, and for example, can include known sensors related with the engine operation and control, such as an Acceleration Position Sensor (APS), an engine torque sensor, an engine RPM sensor, a manifold pressure sensor, an air flow amount sensor, a lambda (λ) sensor, a catalyst temperature sensor, a CAM sensor, and a Crank Position (CKP) sensor if the in-vehicle device is the engine.

In addition, the diagnostic device 202 is illustrated as a separate component in FIG. 3, but the diagnostic device 202 can become logic in the controller 220 of the vehicle terminal 200, or a part or an element in the controller performing the logic rather than a separate component.

In addition, the diagnostic device 202 can become another controller performing the function managing or controlling other parts in the vehicle related with the engine, or the status, the operation and the control of the engine.

For example, the vehicle terminal 200 can become a TMS terminal, the controller 220 in the vehicle terminal can become a Telematics service controller in the TMS terminal, and in this time, the another controller can become the engine controller (ECU/EMS).

The controller 220 of the vehicle terminal 200 can become also the engine controller.

When the engine controller is the another controller, the information delivered to the controller 220 of the vehicle device 200 by the engine controller, or if the engine controller is the controller 220 of the vehicle terminal 200, as will be described later, the information delivered to the external service provider 300 can become a fuel amount, ignition coil diagnostic information, misfire occurrence count information, etc.

In addition, the another controller can include a Battery Management System (BMS), and the information delivered to the controller 220 of the vehicle terminal 200 by the Battery Management System (BMS) can become a battery SOC.

In addition, the controller 220 of the vehicle terminal 200 in each vehicle delivers the information inputted in or collected through the sensor 201 or the diagnostic device 202, or the information related to the status or diagnosis, control determined by its internal logic to the external service provider 300 in real time through the first communication device 210.

Herein, the information are the real-time information delivered from the vehicles during driving on the road as VCRM information, and as described above, can become the information related with the engine, more specifically, the information related with the engine operation and control, the engine status.

The information related to the engine operation, control, and status transmitted from the vehicle terminal 200 to the service provider 300 in real time can become a main signal of the engine controller (ECU or EMS), and for example, can include at least some among an APS value, an engine target torque, an actual engine torque that is an engine torque sensor detection value, an intake manifold pressure, an air flow amount, a battery SOC, a lambda value, a catalyst temperature, a CAM sensor detection value, a Crank Position (CKP), ignition coil diagnostic information, and a misfire occurrence count value.

A first storage 230 in the vehicle terminal 200 stores unique information and setting information for vehicle predictive control of the present disclosure and its service use, and generation information and data generating in the vehicle predictive control process and the service use process.

For example, the unique information and the setting information can include vehicle identification information (ID) that is the unique information for vehicle identification, vehicle type information, and authentication-related information (ID and password) for network connection and service use, etc.

The service provider 300, as the system providing the vehicle predictive control service in accordance with the present disclosure, exchanges various information required for performing the service through the vehicle terminal 200 of each vehicle 1 during driving on the road and the wireless network.

The service provider 300 can include the TMS server 310 connected with each vehicle terminal 200 via the wireless network, and the big data server 320 connected with the TMS server 310 via the wired or the wireless network.

The big data server 320 can be provided for direct communication with the vehicle terminals 200 to perform the vehicle predictive control process in accordance with the present disclosure through the direction communication between the vehicle terminal 200 and the big data server 320 without separately using the conventional TMS server.

Hereinafter, the case that the service provider 300 includes the TMS server 310 and the big data server 320 will be described as an example.

However, if the network environment that can directly communicate between the vehicle terminals 200 and the big data server 320 is built, the TMS server 310 can be deleted, and in this time, the service provider can become the configuration including only the big data server 320 without the TMS server 310.

Figure 4:
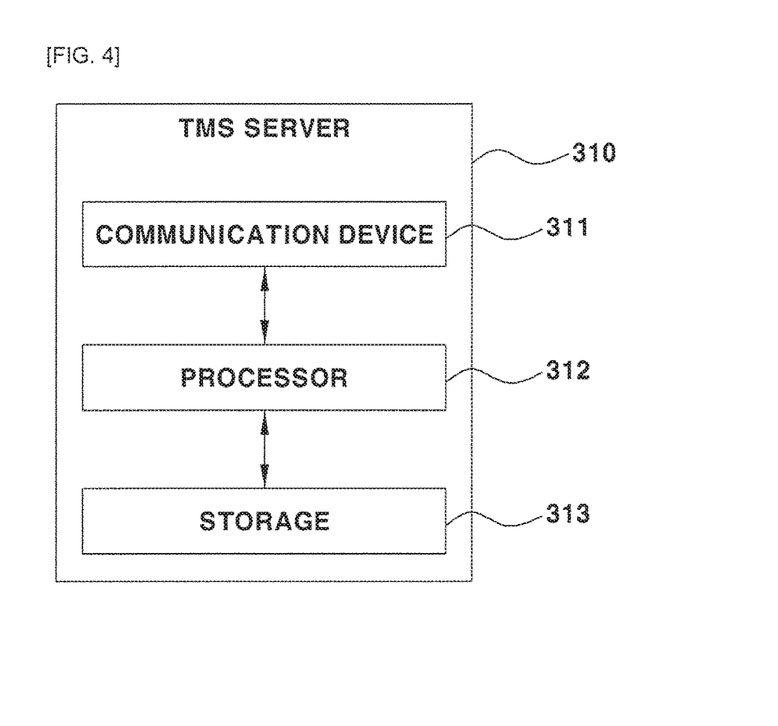
FIG. 4 is a diagram illustrating a configuration of a TMS server in a vehicle predictive control system in accordance with an embodiment of the present disclosure.

FIG. 4 is a diagram illustrating a configuration of the TMS server in the vehicle predictive control system in accordance with the embodiment of the present disclosure.

Firstly, the vehicle predictive control process in accordance with the present disclosure can be performed by adding the big data server 320 while using the pre-installed Telematics service environment, and for this purpose, the service provider 300 outside the vehicle includes the TMS server 310 providing Telematics service to the vehicles 1 that has completed pre-registration, user authentication and network connection procedure for service use.

In the process that the vehicle predictive control in accordance with the present disclosure is performed, the TMS server 310 performs the communication with the vehicles 1 during driving on the road and the big data server 320, delivers the information received in each vehicle terminal 200 to the big data server 320 via the network 100 or a separate wired, wireless communication, and functions as delivering the information received in the big data server 320 to each vehicle terminal 200 via the network 100.

For this purpose, the TMS server 310 can, as illustrated in FIG. 4, include a second communication device 311 for network connection, a first processor 312 for performing information processing, and a second storage 313 for storing information.

Among them, the device communication device 311 is connected with the first communication device 210 of each vehicle terminal 200 using the Telematics service via the wireless network 100, and in addition, connected with a third communication device (321 in FIG. 5) of the big data server 320 via the network 100 or a separate wired, wireless communication.

Thus, the TMS server 310 can exchange the information related with the vehicle predictive control with each vehicle terminal 200 and the big data server 320 through the second communication device 311.

The first processor 312 manipulates and processes the information received between the vehicle terminal 200 and the big data server 320 for the Telematics service and the vehicle predictive control service in accordance with the present disclosure.

In addition, the first processor 312 controls overall operation of the TMS server 310, and for example, can control operation of the second communication device 311 so that the required information can be transmitted and received, or so that the required information can be stored in the second storage 313.

In this time, the first processor 312 can also control the operation of the second communication device 311 so that the information received from the vehicle terminal 200 is delivered to the big data server 320 without a separate processing and manipulation, or so that the information received in the big data server 320 can be delivered to each vehicle terminal 200 selected without a separate processing and manipulation.

In this case, the TMS server 310 can function as relaying information between the pre-registered vehicles 1 and the big data server 320 for use of the Telematics service and the vehicle predictive control service in accordance with the present disclosure.

Figure 5:
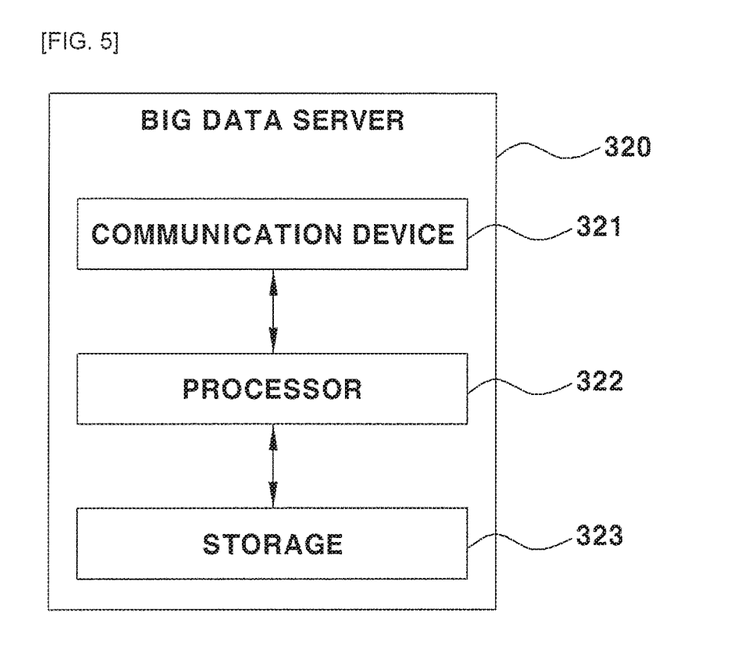
FIG. 5 is a diagram illustrating a configuration of a big data server in a vehicle predictive control system in accordance with an embodiment of the present disclosure.

Then, the big data server 320 can include the third communication device 321, a second processor 322, and a third storage 323, and performs a computer Artificial Intelligence (AI) learning process that learns by collecting, classifying, and analyzing the information transmitted from each vehicle terminals 200 as big data.

The big data server 320 receives the information transmitted from the vehicle terminals 200, for example, status information related with the in-vehicle device such as an engine and the problem occurrence information of the in-vehicle device such as engine stall or failure, fuel efficiency reduction, and power performance degradation through the third communication device 321 in real time, and performs the learning that clusters by processing, classifying, and analyzing the information collected in the second processor 322, and obtains and updates the required information.

That is, by continuously adding and updating the information newly received from the vehicle terminal 200, and the problem occurrence information of the in-vehicle device newly received from the vehicle terminal 200 of at least some vehicles of the plurality of vehicles, the Artificial Intelligence (AI) learning process is performed that updates the information corresponding to the problem occurrence condition based on the cumulated data.

In addition, the big data server 320 includes the data such as the collected information, the classified information, the analyzed data, and the learned result to store various information collected and generated in the vehicle predictive control process in the third storage 323.

Herein, the learning process performed by the big data server 320 will be described in more detail, and in the big data server 320, the processor 322 classifies and databases the information collected through the third communication device 321 in real time to store them in the third storage 323 as big data, and together with continuously cumulating the classified information, performs the analysis for the information through Deep Learning based on Artificial Intelligence (AI) to perform the learning that obtains and updates the information corresponding to the problem occurrence case and its problem occurrence condition for each vehicle.

In this time, the information that the big data server 320 receives from the vehicles 1 in real time is as described above, can become the status information related with the in-vehicle device such as an engine and the problem occurrence information of the in-vehicle device such as engine stall or failure, fuel efficiency reduction, and power performance degradation, and classifies and databases the information to store therein as big data.

In addition, the big data server 320 stores the information obtained and updated in real time in the third storage 323 and also transmits them to each vehicle 1 through the third communication device 321, and the information transmitted by the big data server 320 can be received in each vehicle terminal 200 through the TMS server 310.

Thus, the information transmitted by the big data server 320 and received in the vehicle terminal 200 of each vehicle are used for a feedforward control for the in-vehicle device such as an engine in the vehicle 1, thus preventing the problem occurrence in the vehicle and the accident caused by it.

In the big data server 320, as described above, a series of data, which specify the problem occurrence case and its problem occurrence condition for each vehicle through the analysis based on Artificial Intelligence can be generated, and the generated data for each vehicle is transmitted to the same kind of vehicles 1 during driving.

As an example, the big data server 320 can classify and cluster by periodically receiving the information related to the engine from the vehicle 1 during driving on an actual road; cluster by collecting the engine stall occurrence information and the engine-related information at the timing of the occurrence of the engine stall phenomenon from the vehicle in which the engine stall phenomenon has occurred; and in this time, obtain the information corresponding to the engine stall occurrence condition as final analyzed information by analyzing the change amount of main information.

In this time, the information corresponding to the engine stall occurrence condition can become a value of change amount determined for the status related to the engine.

For example, when the intake manifold pressure has reduced by 10% or more, the fuel amount has reduced by 5% or more, and the APS has increased by 5% or more, if the engine stall phenomenon has occurred, the big data server 320 can obtain the change amount information as the engine stall phenomenon occurrence condition in the vehicle, that is, the problem occurrence condition that the engine stall phenomenon can be caused.

Thus, the information corresponding to the engine stall occurrence condition can include an intake manifold pressure reduction amount, a fuel reduction amount, and an APS value increment amount.

Further, the big data server 320 transmits the engine stall phenomenon occurrence condition information to each vehicle 1, determines if the engine stall can occur in the corresponding vehicle by comparing the engine-related real-time information with the problem occurrence condition upon an engine control of the controller (ECU/EMS) based on the information received in the vehicle terminal 200 in each vehicle, and performs the vehicle control for preventing the engine stall if it is determined that the engine stall can occur.

As an example, the controller can determine if the engine stall of the corresponding vehicle can occur from current engine-related information to perform an engine RPM increment control increasing the engine RPM by a certain amount.

Herein, the controller can be another controller (ECU/EMS) performing the cooperative control with the controller 220 in the vehicle terminal 200, or can be the controller 220 of the vehicle terminal 200.

In various exemplary embodiments of the present disclosure as described herein, the diagnostic device 202 and the communication device 210 are hardware devices, which may be connected to, as separate devices, or embedded in the controller 220.

Figure 6:
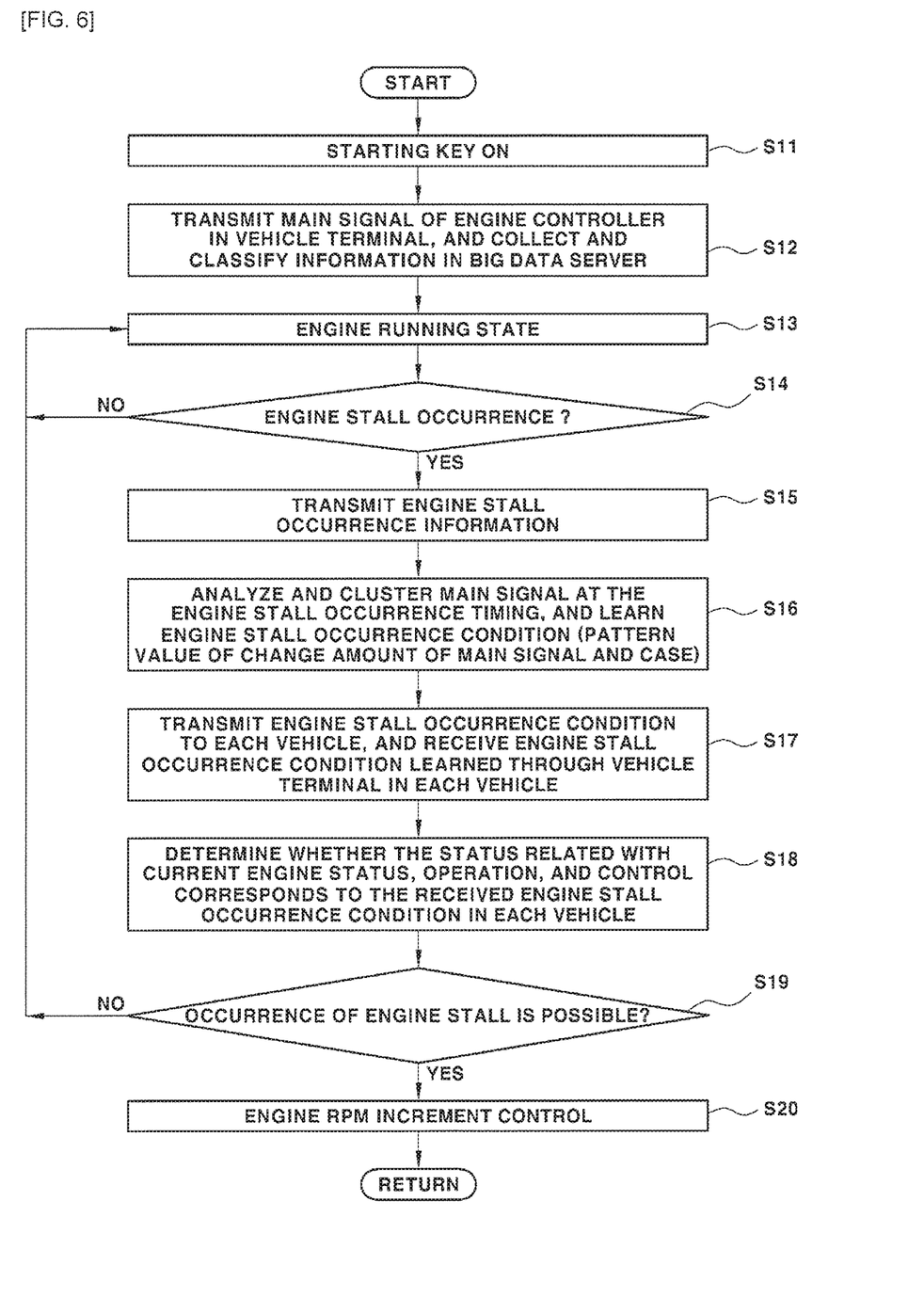
FIG. 6 is a flowchart illustrating a vehicle predictive control method in accordance with an embodiment of the present disclosure.

FIG. 6 is a flowchart illustrating a vehicle predictive control method in accordance with the present disclosure, and hereinafter, the example performing the control for preventing the engine stall as the problem that can occur in the vehicle will be described.

Thus, the vehicle predictive control can include that the engine is controlled by the engine controller in order to prevent engine stall, and can be also, expansively applied to failure of another in-vehicle device or fuel efficiency reduction, engine power performance degradation, etc. as well as the engine stall.

In addition, a feedforward control and predictive control technology based on Artificial Intelligence in accordance with the present disclosure can be expansively applied to another controller, for example, known controllers mounted in the vehicle such as an Electronic Stability Control (ESC), a Body Control Module (BCM), a Hybrid Control Unit (HCU), and a Motor Control Unit (MCU), as well as the engine controller (ECU/EMS), and can be applied according to the required items of each controller.

In the embodiment of the present disclosure, the service provider 300 can collect the information on the engine stall phenomenon from the vehicle 1 during driving on the road as big data and then perform the analysis through Deep Learning, and thereby, cluster the pattern and then transmit the corresponding case to the vehicles during driving on the road, such that when the same phenomenon occurs in the vehicle, the control for preventing the same engine stall phenomenon from occurring in advance can be performed by changing the engine control strategy.

For example, the big data server 320 performs the learning that clusters by classifying and analyzing the data collected from the vehicles 1 based on Artificial Intelligence (AI), and as the learned result, if the condition that a main signal A of the engine increases by 10% or more, B increases by 5% or more, and C decreases by 5% or more has been extracted as the condition that the engine stall phenomenon can occur, transmits the case that the engine stall phenomenon can occur to each vehicle. In this time, the controller in the vehicle performs the engine RPM increment control when predicting that the engine stall will occur based on the received case information.

It is possible to apply the above process to all of the engine stall occurrence vehicle and non-occurrence vehicle, thus preventing the engine stall occurrence due to the same phenomenon and thereby obtaining the productivity and quality of the vehicle.

In addition, it is possible to collect the data from many vehicles during driving on the road and to continuously repeat it, thus obtaining control precision based on Artificial Intelligence and coping with unrecognized situations in the field.

Referring to FIG. 6, firstly, a starting key of the vehicle becomes KEY ON (S11), and the vehicle terminal 200 transmits current engine-related information, that is, VCRM information related with an engine status, operation and control (S12).

In this time, the engine-related VCRM information is transmitted in real time until the controller 220 (or the engine controller) in the vehicle terminal 200 is waked up by the starting KEY ON and is then turned off again; in this time, a main signal of the engine controller transmitted can include sensor and actuator signals, an engine target torque and an actual torque signal, and include at least some among an APS value, an engine target torque, an actual engine torque that is an engine torque sensor detection value, an intake manifold pressure, an air flow amount, a battery SOC, a lambda value, a catalyst temperature, a CAM sensor detection value, a Crank Position, ignition coil diagnostic information, and a misfire occurrence count value.

As described above, if the data transmitted in the vehicle terminal 200 is collected in the big data server 320, the big data server 320 classifies the collected information.

Then, an engine running state becomes (S13), and if the engine controller determines that the engine stall has occurred in the engine running state, the vehicle terminal 200 transmits the engine stall bit VCRM representing that the engine stall has occurred via the network (814, S15).

In the present disclosure, if the engine RPM is less than a predetermined RPM after the engine controller becomes KEY ON, it can be set to determine that the engine stall has occurred.

Then, the big data server 320 analyzes and clusters the main signal at the engine stall occurrence timing to learn the engine stall occurrence condition (S16).

That is, the big data server 320 patterns the change amount of the main signal when the engine stall has occurred, and transmits a pattern value of change amount of the main signal that becomes the engine stall occurrence condition to the vehicle terminal 200 as the engine stall occurrence case information via the network 100.

Then, the big data server 320 transmits the engine stall occurrence condition to each vehicle 1, and eventually, each vehicle 1 receives the engine stall occurrence condition learned through the vehicle terminal 200 (817).

Even after that, the big data server 320 performs the learning newly updating the engine stall occurrence condition based on the information received from the vehicles 1, and delivers the newly learned information to each vehicles 1 again to be used for the control for preventing the engine stall in the vehicle.

The vehicle determines whether the status related to current engine status, operation, and control corresponds to the engine stall occurrence condition based on the information received in the big data server (S18), and if it is determined to be the condition that the engine stall occurrence is possible, the engine RPM increment control is performed under a control of the engine controller (819, S20).

If the engine target RPM (A) is determined in the engine controller, the engine RPM increment control performs the engine RPM control following the target value using the value adding a predetermined setting RPM (B) (e.g., 1000 RPM) to the determined engine target RPM (A) as final target value (=A+B).

The engine RPM increment control can specifically include the control increasing the air flow amount of the engine or an ignition timing advance control, and besides, as the one that can add as a limp home mode, Idle Stop and Go (ISG) entry prohibition, alternator power generation control prohibition, or fuel cut prohibition, etc. can be performed.

Having described the embodiments of the present disclosure in detail with reference to the drawings, the present disclosure is not limited to the above-described embodiments, and various modifications can be made without departing from the technical scope of the present disclosure.

What is claimed is:

1. A vehicle predictive control system based on big data, comprising:
    a plurality of vehicle terminals, each of which being installed in a vehicle, wherein each vehicle terminal collects status information related with an in-vehicle device of the vehicle being driven on the road to transmit the status information in real time, transmits problem occurrence information upon problem occurrence in the in-vehicle device and is configured to control operation of the in-vehicle device; and
    a big data service provider receiving the status information and the problem occurrence information from each vehicle terminal, classifying and storing the status information by vehicle type as big data, and obtaining a problem occurrence condition based on the status information in the in-vehicle device at the time of the problem occurrence, and transmitting information corresponding to the problem occurrence condition to the plurality of the vehicle terminals provided in the vehicles belonging to the same vehicle type and being driven on the road,
    wherein each vehicle terminal determines whether the status information currently collected in real time corresponds to the information corresponding to the problem occurrence condition received from the big data service provider and changes an operation state of the in-vehicle device to a different setting upon determining that the status information corresponds to the information corresponding to the problem occurrence condition,
    wherein the in-vehicle device is an engine,
    wherein the status information related with the in-vehicle device is status information related with the engine,
    wherein the problem occurrence information of the in-vehicle device is engine stall occurrence information, and
    wherein the problem occurrence condition is an engine stall occurrence condition.

2. The vehicle predictive control system of claim 1, wherein the big data service provider comprises:
    a Telematics Multimedia System (TMS) server for receiving and delivering information from the plurality of the vehicle terminals; and
    a big data server for classifying and storing by collecting the information delivered by the TMS server as big data, and generating the information corresponding to the problem occurrence condition when receiving the problem occurrence information of the in-vehicle device delivered by the TMS server, and
    wherein the big data server delivers the information corresponding to the generated problem occurrence conditions to the TMS server, and the TMS server transmits the information corresponding to the problem occurrence condition delivered from the big data server.

3. The vehicle predictive control system of claim 1, wherein the big data service provider comprises a big data server for classifying and storing by collecting information received from the plurality of the vehicle terminals as big data, and generating the information corresponding to the problem occurrence condition when receiving the problem occurrence information of the in-vehicle device of the each vehicle, and
    wherein the big data server delivers the information corresponding to the generated problem occurrence condition to each vehicle terminal.

4. The vehicle predictive control system of claim 1, wherein the information corresponding to the engine stall occurrence condition is a value of change amount of a status related with the engine determined based on the status information of the engine.

5. The vehicle predictive control system of claim 1, wherein the information corresponding to the engine stall occurrence condition comprises an intake manifold pressure decrement amount, a fuel decrement amount, and an Acceleration Position Sensor (APS) value increment amount that are determined based on the received status information of the engine.

6. The vehicle predictive control system of claim 1, wherein the status information related with the engine comprises at least one among an APS value, an engine target torque, an actual engine torque that is an engine torque sensor detection value, an intake manifold pressure, an air flow amount, a battery state of charge (SOC), a lambda value, a catalyst temperature, a camshaft (CAM) sensor detection value, a Crank Position, ignition coil diagnostic information, and a misfire occurrence count value.

7. The vehicle predictive control system of claim 1, wherein the predetermined control performed for the in-vehicle device is to adjust an engine revolutions per minute (RPM) increment that increases an engine RPM by a predetermined setting RPM.

8. The vehicle predictive control system of claim 7, wherein the control for the engine RPM increment comprises an air flow amount increment control or ignition timing advance control of the engine.

9. The vehicle predictive control system of claim 7, wherein the predetermined control further comprises Idle Stop and Go (ISG) entry prohibition, alternator power generation control prohibition, or fuel cut prohibition.

10. The vehicle predictive control system of claim 1, wherein the big data service provider cumulates the status information and the problem occurrence information of the in-vehicle device continuously received from the each of the plurality of the vehicle terminals in real time to perform an Artificial Intelligence (AI) learning process updating the information corresponding to the problem occurrence condition based on the cumulated data.

11. A vehicle predictive control method based on big data, comprising:
    collecting, by a vehicle terminal of each vehicle of a plurality of vehicles, status information related with an in-vehicle device provided in the each vehicle, transmitting the collected status information in real time, and transmitting problem occurrence information upon problem occurrence in the in-vehicle device of the each of the plurality of the vehicles,
    wherein the each vehicle is being driven on the road;
    classifying and storing, by a big data service provider, by collecting the status information transmitted by the vehicle terminal of each vehicle as big data by vehicle type;
    obtaining, by the big data service provider, a problem occurrence condition based on the status information of the in-vehicle device, received at the time of the problem occurrence;
    transmitting, by the big data service provider, information corresponding to the obtained problem occurrence condition to the vehicle terminals provided in the vehicles belonging to the same vehicle type;
    determining, by the vehicle terminal, whether the status information collected in the vehicle corresponds to the problem occurrence condition received from the big data service provider; and
    changing, by the vehicle terminal, an operation state of the in-vehicle device to a different setting upon determining that the status information corresponds to the problem occurrence condition,
    wherein the in-vehicle device is an engine,
    wherein the status information related with the in-vehicle device is status information related with the engine;
    wherein the problem occurrence information of the in-vehicle device is engine stall occurrence information; and
    wherein the problem occurrence condition is an engine stall occurrence condition.

12. The vehicle predictive control method of claim 11, wherein the information corresponding to the engine stall occurrence condition is a value of change amount of a status related with the engine determined based on the status information of the engine.

13. The vehicle predictive control method of claim 11, wherein the information corresponding to the engine stall occurrence condition comprises an intake manifold pressure decrement amount, a fuel decrement amount, and an Acceleration Position Sensor (APS) value increment amount that are determined based on the received status information of the engine.

14. The vehicle predictive control method of claim 11, wherein the status information related with the engine comprises at least one among an APS value, an engine target torque, an actual engine torque that is an engine torque sensor detection value, an intake manifold pressure, an air flow amount, a battery SOC, a lambda value, a catalyst temperature, a CAM sensor detection value, a Crank Position, ignition coil diagnostic information, and a misfire occurrence count value.

15. The vehicle predictive control method of claim 11, wherein the predetermined control performed for the in-vehicle device is to adjust an engine RPM increment that increases the engine RPM by a predetermined setting RPM.

16. The vehicle predictive control method of claim 15, wherein the control for the engine RPM increment comprises an air flow amount increment control or an ignition timing advance control of the engine.

17. The vehicle predictive control method of claim 15, wherein the predetermined control further comprises Idle Stop and Go (ISG) entry prohibition, alternator power generation control prohibition, or fuel cut prohibition.

18. The vehicle predictive control method of claim 11, wherein the big data service provider cumulates the status information received from the vehicle terminal and the problem occurrence information of the in-vehicle device received from the vehicle terminal of the each of the plurality of vehicles to perform an Artificial Intelligence (AI) learning process updating the information corresponding to the problem occurrence condition based on the cumulated data.

* * * * *